United States Patent
Lahbil et al.

(10) Patent No.: US 11,451,184 B2
(45) Date of Patent: Sep. 20, 2022

(54) SYSTEM FOR CONTROLLING A SWITCH, SWITCHING ARM AND ELECTRICAL INSTALLATION

(71) Applicant: Valeo Equipements Electriques Moteur, Creteil (FR)

(72) Inventors: Hicham Lahbil, Creteil (FR); Romuald Morvany, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 17/256,357

(22) PCT Filed: Jun. 28, 2019

(86) PCT No.: PCT/EP2019/067464
§ 371 (c)(1),
(2) Date: Dec. 28, 2020

(87) PCT Pub. No.: WO2020/002670
PCT Pub. Date: Jan. 2, 2020

(65) Prior Publication Data
US 2021/0273596 A1 Sep. 2, 2021

(30) Foreign Application Priority Data
Jun. 28, 2018 (FR) ...................... 1855896

(51) Int. Cl.
*H02P 29/028* (2016.01)
*H02P 29/024* (2016.01)

(52) U.S. Cl.
CPC .......... *H02P 29/027* (2013.01); *H02P 29/028* (2013.01); *H02P 29/0241* (2016.02)

(58) Field of Classification Search
CPC ... H02P 29/0241; H02P 29/027; H02P 29/028
See application file for complete search history.

(56) References Cited

U.S. PATENT DOCUMENTS

| | | | |
|---|---|---|---|
| 6,771,040 B2* | 8/2004 | Kusumoto | ............. H02P 9/305 318/140 |
| 7,224,145 B2* | 5/2007 | Pierret | .................... F02N 11/04 322/25 |

(Continued)

FOREIGN PATENT DOCUMENTS

| | | |
|---|---|---|
| FR | 3047854 A1 | 8/2017 |
| JP | 2005-532025 A | 10/2005 |

(Continued)

OTHER PUBLICATIONS

International Search Report and Written Opinion in corresponding International Application No. PCT/EP2019/067464, dated Mar. 9, 2019 (10 pages).

(Continued)

*Primary Examiner* — Thai T Dinh
(74) *Attorney, Agent, or Firm* — Osha Bergman Watanabe & Burton LLP

(57) ABSTRACT

A control system has a microcontroller (242) that receives a mode request (MR), a command-generating device (244) to supply commands and to transfer the mode request (MS) to an output pin of the microcontroller (242), and a device for detecting accidental starting (258), as well as a pilot (260) that supplies an output command signal to the switch (222; 224). The pilot (260) is connected to the output pin to receive the transmitted mode request (MS). The output pin is connected to an input pin of the microcontroller (242) to receive the transmitted mode request (MS), and the accidental starting detection device (258) detects when the transmitted mode request (MS) received on the input pin indicates a motor mode even though the mode request (MR) received by the microcontroller (242) indicates an alternator mode and, when this is the case, sends an inhibition command (INHIB_P; INHIB_T) to the pilot (260).

10 Claims, 2 Drawing Sheets

(56) References Cited

U.S. PATENT DOCUMENTS

| | | | | |
|---|---|---|---|---|
| 7,911,188 B2* | 3/2011 | Wada | ................... | B60K 1/00 |
| | | | | 322/44 |
| 8,054,016 B2* | 11/2011 | Gottemoller | ............ | H02P 23/14 |
| | | | | 318/143 |
| 9,991,833 B2* | 6/2018 | Seki | ................... | H02P 21/04 |
| 2009/0224541 A1* | 9/2009 | Stahlhut | ................... | B60K 6/26 |
| | | | | 290/7 |
| 2010/0274425 A1* | 10/2010 | Ranier | ................... | F02N 11/04 |
| | | | | 180/65.265 |
| 2015/0145448 A1* | 5/2015 | Mukai | ................. | B62D 5/0487 |
| | | | | 318/400.21 |

FOREIGN PATENT DOCUMENTS

| | | | |
|---|---|---|---|
| WO | 2009/081066 A2 | 7/2009 | |
| WO | 2011/121195 A1 | 10/2011 | |

OTHER PUBLICATIONS

Notice of Reasons for Refusal in corresponding Japanes Application No. 2020-572799, dated Apr. 1, 2022 (10 pages).

* cited by examiner

SYSTEM FOR CONTROLLING A SWITCH, SWITCHING ARM AND ELECTRICAL INSTALLATION

TECHNICAL FIELD

The present invention relates to a system for controlling a switch, a switching arm and an electrical installation.

PRIOR ART

There is a known way of using a control system for a switch of a voltage converter intended to be connected to a rotating electrical machine, of the type comprising:
- a microcontroller designed to receive a mode request and implementing:
  - a command-generating device designed to supply commands and to transfer the mode request to an output pin of the microcontroller, and
  - an accidental starting detection device,
- a driver designed to supply an output command signal to the switch, the driver being connected to the output pin to receive the transmitted mode request, the driver also being designed to generate the output command signal from the commands received from the microcontroller, the driver also being designed to receive a disable command and, while the driver is receiving the disable command, to supply the output command signal to the switch independently of the commands received.

In this known control system, the accidental starting detection device is designed to compare the mode request received by the microcontroller with a data element stored in the microcontroller and representing the mode required. Thus, if the microcontroller fails and the stored data element indicates a motor mode that is not desired, there is a risk of accidental starting, and the accidental starting detection device sends a disable command to the driver.

The object of the invention is to improve the detection of the failure of the microcontroller.

BRIEF DESCRIPTION OF THE INVENTION

For this purpose, a control system of the aforesaid type is proposed, characterized in that the output pin is connected to an input pin of the microcontroller to receive the transmitted mode request, and in that the accidental starting detection device is designed to detect when the transmitted mode request received on the input pin indicates a motor mode even though the mode request received by the microcontroller indicates an alternator mode, and, in this case, to send the disable command to the driver.

As a result of the invention, the data element compared with the mode request received by the microcontroller really is the mode request sent to the driver, whereas, in the known control system, the data element stored in the microcontroller could be different, if the microcontroller fails, from the mode request transmitted to the driver.

Optionally, the driver is designed to receive what is known as a partial disable command, the driver being designed to remain, as long as the partial disable command is received, in what is known as a degraded alternator mode, in which the driver is designed to supply the output command signal to the switch independently of the commands received from the microcontroller, so that the rotating electrical machine can operate in alternator mode.

Also optionally, the disable command sent by the accidental starting detection device is a partial disable command.

Also optionally, the control system further comprises:
- a first sensor designed to supply a measurement of a first voltage to the microcontroller,
- a first device for monitoring the measurement of the first voltage, designed to supply the disable command to the driver when the measurement of the first voltage falls below a predefined threshold, and the first monitoring device is implemented by the microcontroller.

Also optionally, the driver comprises a first input intended to receive what is known as a total disable command, and the driver is also designed so that, as long as the total disable command is received on the first input, the output command signal keeps the switch open independently of the commands (cmd) received.

Also optionally, the driver comprises a command management device designed to generate an input command signal from the commands received from the microcontroller, and an amplifier designed to amplify the input command signal in order to supply the output command signal to the switch, the amplifier having two positive and negative supply terminals intended to receive a supply voltage, and the driver further comprises a device for disabling the amplifier which is designed, on receiving the total disable command, to reduce the supply voltage so that the output command signal keeps the switch open regardless of the input command signal.

Also optionally, the disabling device is designed to short-circuit the supply terminals of the amplifier on receiving the total disable command.

Also optionally, the disabling device comprises a controllable short circuit switch having a current input terminal connected to the positive supply terminal, a current output terminal connected to the negative supply terminal, and a control terminal, the total disable command taking the form of a voltage between the control terminal and the current output terminal.

Also optionally, the first device for monitoring the measurement of the first voltage is designed to supply the total disable command to the first input of the driver when the measurement of the first voltage falls below the predefined threshold, the driver further comprises a second input intended to receive the partial disable command, and the control system further comprises:
- a second sensor designed to supply a measurement of a second voltage, different from the first voltage,
- a second device for monitoring the measurement of the second voltage, designed to supply the partial disable command to the second input of the driver when the measurement of the second voltage falls below a predefined threshold.

A switching arm system for a voltage converter is also proposed, comprising:
- a high-side switch,
- a low-side switch,
- a control system for one of the high-side and low-side switches, according to the invention, in which the high-side switch and the low-side switch are connected to each other at a midpoint intended to be connected to a phase of a rotating electrical machine.

Optionally, the switching arm system further comprises a control system for the other of the high-side and low-side switches, according to the invention.

An electrical installation is also proposed, comprising:
a control system according to the invention, and
a first continuous voltage source designed to supply the first voltage.

DETAILED DESCRIPTION

Figure 1:
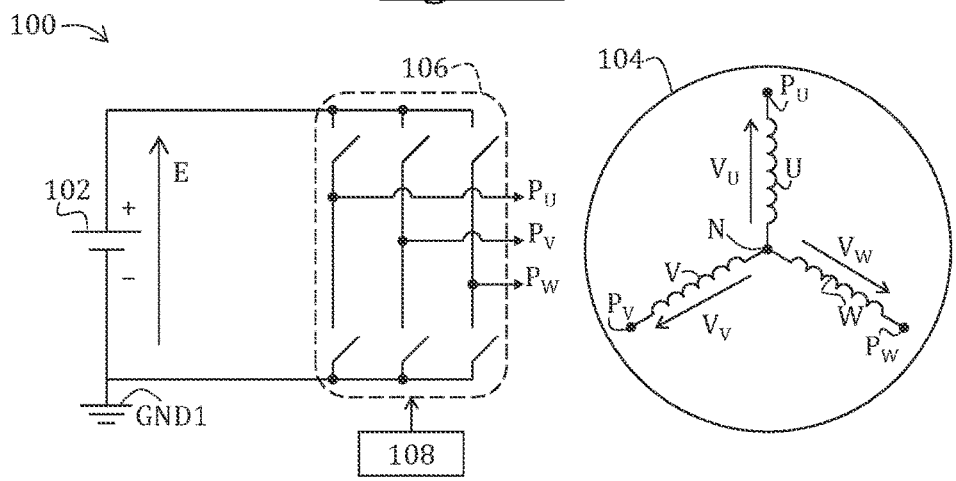
FIG. 1 is a simplified electrical diagram of an electrical system 100 according to the invention, comprising a continuous voltage source, a rotating electrical machine, and a voltage converter connected between them.

With reference to FIG. 1, an electrical system 100 according to the invention will now be described. The electrical system 100 is, for example, intended to be implemented in a motor vehicle.

The electrical system 100 comprises, in the first place, a continuous voltage source 102 comprising a positive terminal and a negative terminal, the latter being usually connected to an electrical ground, denoted GND1 on the figures, such as a chassis of the motor vehicle. The continuous voltage source 102 is designed to supply a continuous input voltage E between these terminals, at a level of about 12 V for example.

The electrical system 100 further comprises a rotating electrical machine 104 comprising stator phases U, V, W, the respective first ends of which, in the example described, are connected to the same neutral point N. In the example described, the rotating electrical machine 104 forms part of an alternator-starter coupled to a heat engine (not shown) of the motor vehicle. The rotating electrical machine 104 is thus designed to operate alternatively motor mode, in which it assists the heat engine, and in alternator mode, in which it converts some of the mechanical energy generated by the heat engine into electrical energy for recharging the continuous voltage source 102.

The electrical system 100 further comprises a voltage converter 106 connected to the terminals of the continuous voltage source 102 on the one hand, and to the rotating electrical machine 104 on the other hand.

The voltage converter 106 comprises switching arms associated with the stator phases U, V, W, respectively. Each switching arm comprises a high-side switch connected to the positive terminal of the continuous voltage source 102 and a low-side switch connected to the negative terminal of the continuous voltage source 102. The high-side switch and the low-side switch are also connected to each other at a midpoint connected to the associated stator phase U, V, W. Each switching arm is intended to be controlled to switch between two configurations. In the first, called the high configuration, the high-side switch is closed and the low-side switch is open, so that the input voltage E is applied to a second end of the associated stator phase U, V, W. In the second, called the low configuration, the high-side switch is open and the low-side switch is closed, so that a zero voltage is applied to the second end of the associated stator phase U, V, W.

The voltage converter 106 is intended to be controlled to cause each arm to switch between these two configurations, so as to supply electricity to the rotating electrical machine 104 when it is required to operate in motor mode, and to supply electricity to the continuous voltage source 102 when the rotating electrical machine 104 is required to operate in alternator mode.

Thus the electrical system 100 further comprises a control system 108 for the voltage converter 106, which is described in detail below.

Figure 2:
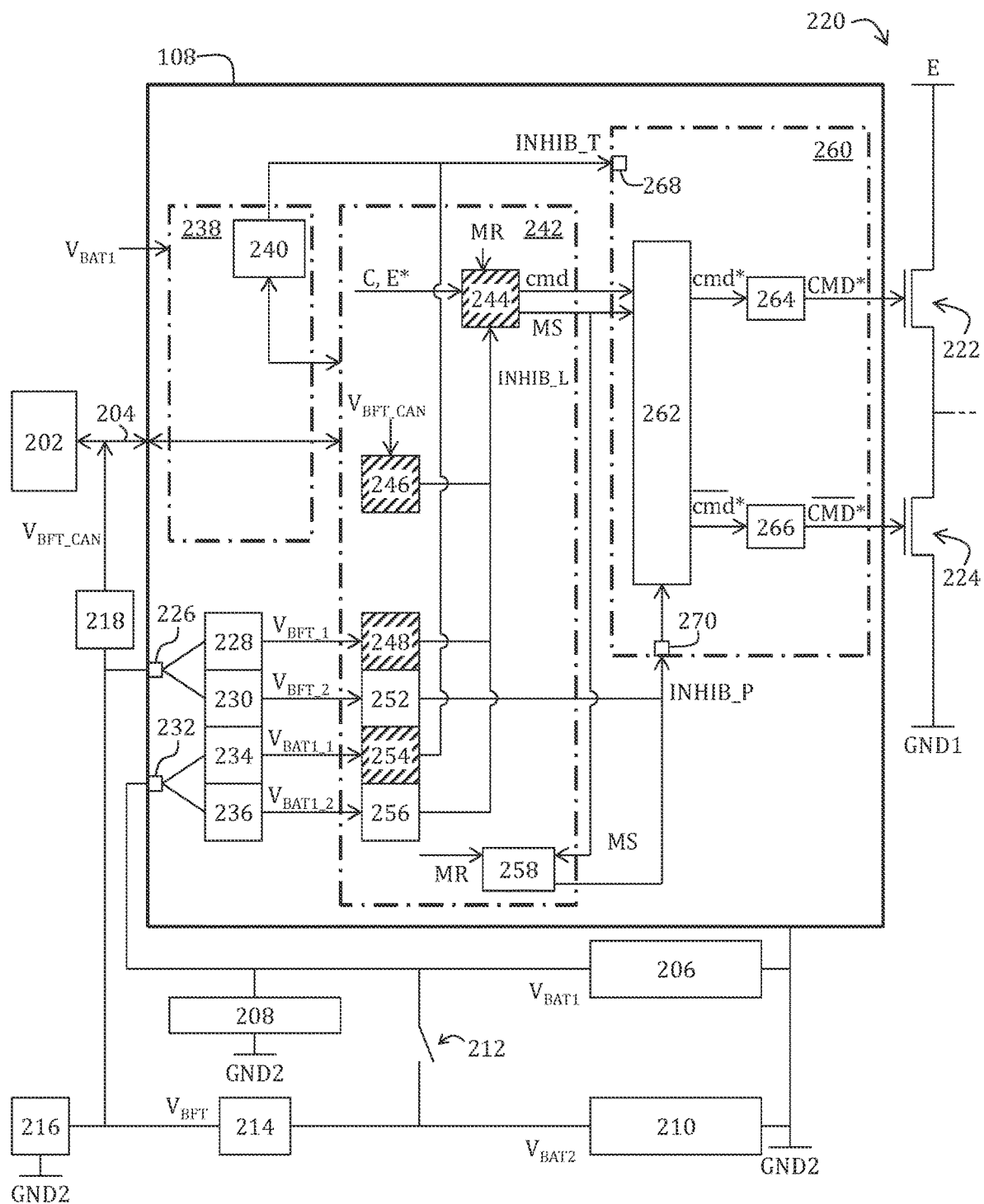
FIG. 2 is a block diagram of a control system of the voltage converter of FIG. 1.

With reference to FIG. 2, the electrical system 100 further comprises an electronic control unit (or ECU) 202 and a data bus 204, which in the example described is a CAN (Controller Area Network) bus interconnecting the electronic control unit 202 and the control system 108.

The electrical system 100 further comprises a continuous voltage source 206 designed to supply a continuous voltage $V_{BAT1}$ relative to an electrical ground which is denoted GND2 on the figures and is usually connected to the chassis of the motor vehicle. In the example described, the continuous voltage source 206 comprises a Li-ion battery and the voltage $V_{BAT1}$ is, for example, approximately 12V. The voltage source 102 supplying the voltage E uses, for example, the voltage source 206, so that the voltage E is derived from the voltage $V_{BAT1}$.

The electrical system 100 further comprises a starter 208 designed to assist the starting of the heat engine of the motor vehicle when the alternator-starter cannot do so, for example when the temperature of the heat engine is too low.

The electrical system 100 further comprises a continuous voltage source 210 designed to supply a continuous voltage $V_{BAT2}$ relative to the electrical ground $GND_2$. In the example described, the continuous voltage source 210 comprises a lead acid battery and the voltage $V_{BAT2}$ is, for example, approximately 12 V.

The electrical system 100 further comprises a controllable switch 212 which is intended, when closed, to connect the two continuous voltage sources 206, 210 to each other so that they cooperate to supply sufficient current to the starter 208 when it operates.

The electrical system 100 further comprises a battery fuse terminal 214 (or BFT) connected to the continuous voltage source 210 to supply a voltage $V_{BFT}$, substantially equal to the voltage $V_{BAT2}$ and therefore at a level of approximately 12 V in the example described.

The electrical system 100 further comprises electrical components 216 connected to the battery fuse terminal 214 to receive the voltage $V_{BFT}$ and thus to be supplied with electricity.

The battery fuse terminal 214 comprises at least one fuse (not shown) intended to break the connection to the continuous voltage source 210 when the current passing through this fuse becomes too great, for example if one of the electrical components 216 is short-circuited.

The electrical system 100 further comprises a voltage sensor 218 designed to supply a measurement $V_{BFT\_CAN}$ of the voltage $V_{BFT}$ in the data bus 204.

The control system 108 will now be described in greater detail for the control of a switching arm of the voltage converter 106 of FIG. 1. This switching arm, denoted by the reference 220, comprises, as explained above with reference to FIG. 1, a high-side switch, denoted by the reference 222, and a low-side switch, denoted by the reference 224. The high-side switch 222 has a current input terminal connected to the positive terminal of the continuous voltage source 102, a current output terminal connected to the midpoint of the switching arm 220, and a control terminal. The low-side switch 224 has a current input terminal connected to the midpoint, a current output terminal connected to the electrical ground GND1, and a control terminal.

The control system 108 comprises, in the first place, an input 226 connected to the battery fuse terminal 214 to receive the voltage $V_{SFT}$.

The control system 108 further comprises two sensors 228, 230 connected to the input 226 and designed to supply, respectively, two measurements $V_{BFT\_1}$, $V_{BFT\_2}$ of the voltage $V_{BFT}$.

The control system 108 further comprises an input 232 connected to the continuous voltage source 206 to receive the voltage $V_{BAT1}$.

The control system 108 further comprises two sensors 234, 236 connected to the input 232 and designed to supply, respectively, two measurements $V_{BAT1\_1}$, $V_{BAT1\_2}$ of the voltage $V_{BAT1}$.

The control system 108 further comprises a microcontroller 242 and a driver 260, which will now be described. For example, a driver (similar to the driver 260) is provided for each switching arm of the voltage converter 106, and a single microcontroller 242 is provided for all the drivers.

As is known, the microcontroller 242 is a computer device having a processing unit and a main memory (not shown). One or more computer programs are recorded in the main memory and are intended to be executed by the processing unit in order to implement the devices that will now be described.

Thus the microcontroller 242 implements, in the first place, a command-generating device 244.

The command-generating device 244 is primarily designed to receive from the data bus 204 a mode request, denoted MR in the figures, indicating the mode in which the voltage converter 106 is to be controlled, which may be alternator mode or motor mode. The command-generating device 244 is thus designed to operate selectively in motor mode or in alternator mode, according to the mode request MR received from the data bus 204.

The command-generating device 244 is designed to generate commands, denoted cmd in the figures, to be sent to the driver 260, these commands cmd being adapted to the mode in which it is operating. More precisely, in motor mode, the command-generating device 244 is designed to generate the commands cmd on the basis of a required target torque C at the end of the shaft of the rotating electrical machine 104. In alternator mode, the command-generating device 244 is designed to generate the commands cmd on the basis of a target voltage E* for the voltage E. The target torque C and the target voltage E* are, for example, received from the data bus 204.

The command-generating device 244 is also designed to transmit the mode request MR to the driver 260. To distinguish the mode request MR received from the mode request that is transmitted, the latter is called the mode selection and denoted MS on the figures.

The command-generating device 244 is also designed so that, as long as it receives what is known as a software disable command, denoted INHIB_L, it supplies the driver 260 with commands cmd intended to cause the opening of the switches 222, 224 independently of the instructions received (C, E*).

The microcontroller 242 also implements a device 246 for monitoring the measurement $V_{BFT\_CAN}$, designed to supply a software disable command INHIB_L to the command generating device 244 when the measurement $V_{BFT\_CAN}$ falls below a predefined threshold. In the example described, this predefined threshold is between 8 V and 11 V, for example 10.8 V.

The microcontroller 242 also implements a device 248 for monitoring the measurement $V_{BFT\_1}$, designed to supply a software disable command INHIB_L to the command generating device 244 when the measurement $V_{BFT\_CAN}$ falls below a predefined threshold. In the example described, this predefined threshold is between 8 V and 11 V, for example 10.8 V.

The microcontroller 242 also implements a device 252 for monitoring the measurement $V_{BFT\_2}$, designed to supply what is known as a partial disable command, denoted INHIB_P, to the driver 260 when the measurement $V_{BFT\_2}$ falls below a predefined threshold. In the example described, this predefined threshold is between 8 V and 11 V, for example 10.8 V.

The microcontroller 242 also implements a device 254 for monitoring the measurement $V_{BFT\_1}$, designed to supply what is known as a total disable command, denoted INHIB_T, to the driver 260 when the measurement $V_{BFT\_1}$ falls below a predefined threshold. In the example described, this predefined threshold is between 5 V and 8 V, for example 5.5 V.

The microcontroller 242 also implements a device 256 for monitoring the measurement $V_{BAT1\_2}$, designed to supply a software disable command INHIB_L to the command generating device 244 when the measurement $V_{BAT1\_2}$ falls below a predefined threshold. In the example described, this predefined threshold is between 5 V and 8 V, for example 5.5 V.

It will be appreciated that the predefined threshold for the measurements of the voltage $V_{BFT}$ is higher than the predefined threshold for the measurements of the voltage $V_{BAT1}$. This is because there is a risk that a Li-ion battery will ignite and/or give off toxic gases if even a small undervoltage occurs. On the other hand, this risk is very low for a lead battery, and therefore a greater undervoltage can be tolerated.

The microcontroller 242 also implements an accidental starting detection device 258. There is a risk that accidental starting may occur if there is a failure in the microcontroller 242. In this case, there is a risk that the faulty microcontroller 242 may switch to motor mode and send the driver 260 a mode selection MS indicating a switch to motor mode even though the received mode request MR indicates the use of alternator mode (the motor vehicle is stopped). Thus the accidental starting detection device 258 is designed to detect when the mode selection MS indicates motor mode even though the mode request MR indicates alternator mode. In this case, the accidental starting detection device 258 is designed to send a partial disable command INHIB_P to the driver 260.

To ensure that the accidental starting detection device 258 actually receives the mode selection MS sent by the microcontroller 242, the accidental starting detection device 258 is designed to monitor an input pin of the microcontroller 242 connected to an output pin of the microcontroller 242 connected to the driver 260 and carrying the mode selection MS.

Additionally, in the example described, the microcontroller 242 has two levels of execution which are at least structurally separated, called the functional level and the monitoring level. The devices 244, 246, 248, 254 are implemented in the functional level of the microcontroller 242, as indicated in FIG. 2 by the hatching, while the devices 252, 256, 258 are implemented in the monitoring level of the microcontroller 242, as indicated in FIG. 2 by the absence of hatching. The structural separation may use two mechanisms (which may be implemented at the same time). In the first mechanism, the processing unit comprises two separate cores, dedicated to the two levels respectively. Thus the microcontroller 242 is designed so that the devices of each of the two levels are executed exclusively by the core associated with this level, and not by the other core. In the second mechanism, two predefined memory ranges of the main memory are dedicated to the two levels respectively. Thus the microcontroller 242 is designed so that the devices of each of the two levels exclusively use the memory range associated with this level, and not the other memory range.

The control system 108 further comprises a monitoring device 240 (or "watchdog") for monitoring the microcontroller 242. This monitoring device 240 is designed to supply a total disable command INHIB_T to the driver 260 if a failure of the microcontroller 242 is detected.

The driver 260 will now be described in greater detail. In the example described, the driver 260 is implemented at least partially by a specific integrated circuit ("application-specific integrated circuit", or ASIC).

The driver 260 comprises a command management device 262 and two amplifiers, on the high side 264 and the low side 266 respectively.

The command management device 262 is designed to receive the commands cmd from the microcontroller 242, and to supply input command signals cmd*, $\overline{cmd}$* to the two amplifiers 264, 266 respectively, on the basis of the commands cmd. The input command signals cmd*, $\overline{cmd}$* are substantially complementary to each other. The input command signals cmd*, $\overline{cmd}$* are amplified by the amplifiers 264, 266 respectively, to obtain respective output command signals CMD*, $\overline{CMD}$* which are supplied to the switch 222, 224, so that the rotating electrical machine 104 can operate in motor mode or in alternator mode, depending on the mode in which the microcontroller 242 is operating.

The command management device 262 is also designed to receive a partial disable command INHIB_P and, as long as the partial disable command INHIB_P is received, to operate in what is called a degraded alternator mode, in which the command management device 262 is designed to generate on its own, that is to say independently of the commands cmd and the mode selection MS received from the microcontroller 242, the input command signals cmd*, $\overline{cmd}$* that are supplied to the amplifiers 264, 266. The input command signals cmd*, $\overline{cmd}$* are again amplified, by the amplifiers 264, 266, to obtain respective output command signals CMD*, $\overline{CMD}$* which are supplied to the switch 222, 224 so that the rotating electrical machine 104 can operate in alternator mode.

The driver 260 further comprises a partial disable input 270 connected to the devices 252, 258 so as to receive the partial disable command INHIB_P supplied by either of these devices 252, 258. This partial disable input 270 is also connected to the command management device 262 of the driver 260 to supply it with each partial disable command INHIB_P received, for the purpose of switching to degraded alternator mode.

The driver 260 further comprises a total disable input 268 connected to the monitoring devices 254, 240 so as to receive the total disable command INHIB_T supplied by either of these devices 254, 240. As long as a total disable command INHIB_T is received on the total disable input 268, the driver 260 is designed to supply output command signals CMD*, $\overline{CMD}$* which keep the switches 222, 224 open independently of the commands cmd received from the microcontroller 242. The way in which this function is performed will be explained subsequently with reference to FIG. 3.

The control system 108 further comprises a system basis chip (SBC) 238 connected to the data bus 204 and to the continuous voltage source 206 (via the input 232, for example) to receive the voltage $V_{BAT1}$. The system basis chip 238 is designed to perform a number of functions, including the supply of one or more supply voltages, notably for the microcontroller 242 and for the driver 260, from the voltage $V_{BAT1}$, the transmission of messages between the data bus 204 and the microcontroller 242, and the monitoring of the microcontroller 242. To perform the last of these functions, the system basis chip 238 comprises the monitoring device 240.

It will be appreciated that the voltage $V_{BAT1}$ is used to supply the driver 260 and the microcontroller 242. Thus an undervoltage of the voltage $V_{BAT1}$ is a critical failure for the control system 108. This is why the monitoring device 254 supplies a total disable command INHIB_T intended to keep the switches 222, 224 constantly open. On the other hand, an undervoltage of the voltage $V_{BFT}$ is less critical (for the control system 108, at any rate), and therefore the degraded alternator mode may be retained. This is why the disable command from the device 252 is supplied to the partial disable input 270 of the driver 260.

Figure 3:
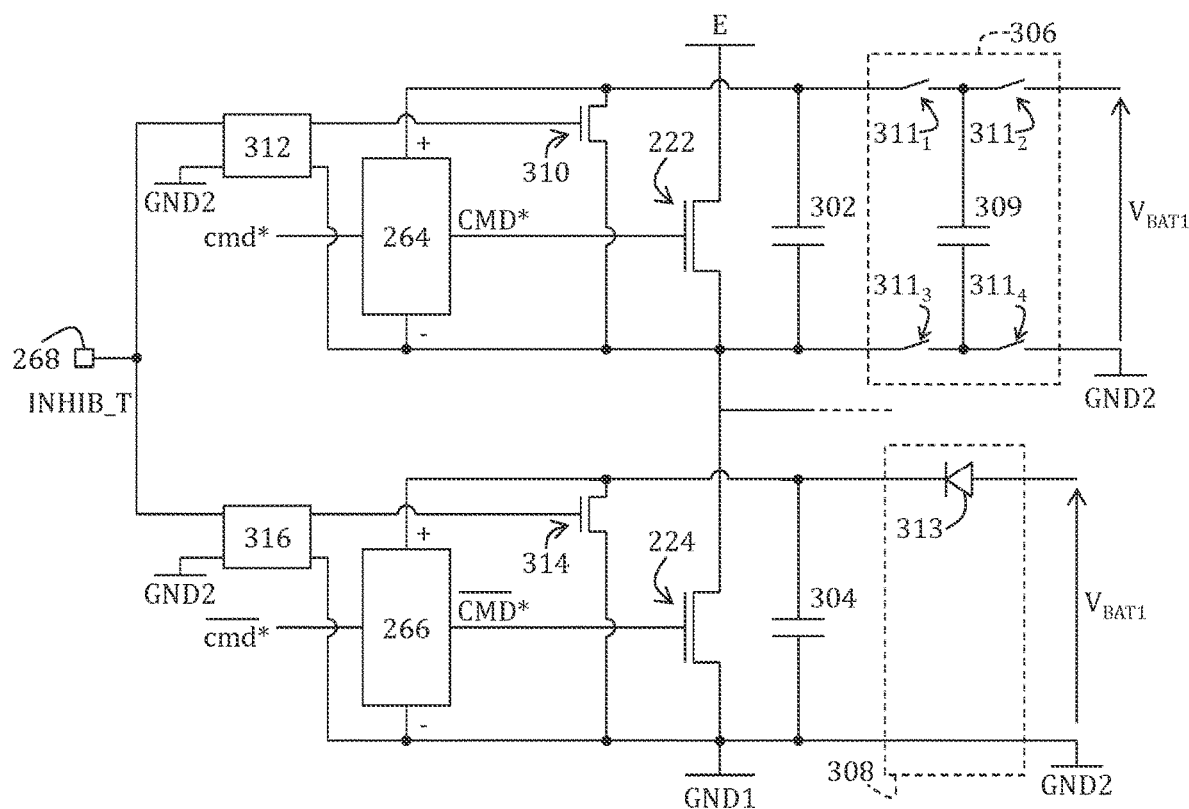
FIG. 3 is an electrical diagram illustrating the elements of the control system for opening a switch of the voltage converter independently of the command signals for this switch.

With reference to FIG. 3, the elements performing the total disable function will now be described.

As shown in FIG. 3, the high-side amplifier 264 and the low-side amplifier 266 are designed to receive the input command signal cmd* and $\overline{cmd}$* respectively, to amplify this input command signal cmd* and $\overline{cmd}$* respectively, to obtain the output command signal CMD* and $\overline{CMD}$* respectively, and to apply the output command signal CMD* and $\overline{CMD}$* respectively to the high-side switch 222 and the low-side switch 224 respectively, in order to open and close it selectively.

Each amplifier 264, 266 has two supply terminals, positive (denoted + in FIG. 3) and negative (denoted − in FIG. 3), intended to receive a supply voltage for this amplifier 264, 266. The negative supply terminal is connected to the current output terminal of the high-side amplifier 222 or of the low-side amplifier 224 respectively.

The driver 260 further comprises two bootstrap capacitors 302, 304 connected between the positive and negative terminals, respectively, of the amplifiers 264, 266 to supply the respective supply voltages.

The driver 260 further comprises two charging devices 306, 308 for charging the two bootstrap capacitors 302, 304 respectively from a voltage, which is the voltage $V_{BAT1}$ in the example described. The charging device 306 comprises, for example, a charge pump. This pump comprises, for example, a capacitor 309 connected to the voltage $V_{BAT1}$ and to the capacitor 302 via four switches $311_1$, $311_2$, $311_3$, $311_4$. These switches are commanded to connect the capacitor 309 to the voltage $V_{BAT1}$ and to the bootstrap capacitor 302 alternatively. The charging device 308 comprises, for example, a diode 313 allowing the flow of current from the voltage $V_{BAT1}$ to the bootstrap capacitor 304.

The driver 260 further comprises a device 310 for disabling the high-side amplifier 264. The disabling device 310 is connected to the total disable input 268 to receive a total disable command INHIB_T, and is designed, on receiving the total disable command INHIB_T, to reduce the supply voltage between the supply terminals of the high-side amplifier 364, so that the output command signal CMD* causes the opening of the high-side switch 222, regardless of the input command signal cmd* received.

In the example described, the disabling device 310 is designed, on receiving the total disable command INHIB_T, to short-circuit the supply terminals of the high-side amplifier 264, thereby discharging the bootstrap capacitor 302 and reducing the supply voltage of the high-side amplifier 264. For example, the disabling device 310 is designed to cancel this supply voltage. The decrease in the supply voltage causes a decrease in the output command signal CMD*, such that at one point this output command signal CMD* is no longer sufficient, even at its maximum, to cause the closure of the high-side switch 222. Thus this switch remains open.

More precisely, in the example described, the disabling device 310 comprises a controllable short circuit switch having a current input terminal connected to the positive supply terminal, a current output terminal connected to the negative supply terminal, and a control terminal. Additionally, the driver 260 comprises a level shifter device 312 connected between the total disable input 268 and the disabling device 310. The controllable short-circuit switch is, for example, an isolated field effect transistor ("metal oxide semiconductor field effect transistor", or MOSFET).

Each total disable command INHIB_T applied to the total disable input 268 takes the form of a voltage relative to the electrical ground GND2. The level shifter 312 is designed to receive this voltage and to shift it so as to supply the total disable command INHIB_T in the form of a voltage between the control terminal of the controllable short-circuit switch and the negative terminal of the high-side amplifier 264.

Similarly, for disabling the low-side amplifier 266, the driver 260 comprises a disabling device 314 and a level shifter 316.

It is apparent from the above that the function of total disabling of the switches 222, 224 is independent of the input command signals cmd*, $\overline{\text{cmd}}$* received by the amplifiers 264, 266. Thus, if there is a failure of the command management device 262, the two switches 222, 224 can still be opened. Additionally, the solution described uses a smaller number of components, which are of the simplest type, so that disabling is rapid. In the example described, the time between the application of a total disable command signal INHIB_T to the total disable input 268 and the actual disabling of the amplifiers 264, 266 is less than 500 μs, for example 400 μs. Now, the delay usually required between the occurrence of a failure and the opening of the switches 222, 224 is about 1 ms. Thus the delay of 400 μs for executing the disable command leaves 600 μs for the detection of the failure, which is usually sufficient.

The present invention is not limited to the embodiment described above. Indeed, it will be apparent to those skilled in the art that modifications may be made to it.

For example, at least one of the monitoring devices 252, 254 could be formed outside the microcontroller 242 in one or two pre-wired components (that is to say, components not executing a computer program).

Additionally, as a general rule, each of the monitoring devices 246, 248, 252, 254, 256 may be connected both to the total disable input 268, for causing the switches 222, 224 to open in motor mode and in alternator mode, and to the partial disable input 270, for switching the driver to degraded alternator mode.

Furthermore, the terms used are not to interpreted as being limited to the elements of the embodiment described above, but are to be interpreted as covering all the equivalent elements that those skilled in the art may derive from their general knowledge.

The invention claimed is:

1. A control system for a switch of a voltage converter configured to be connected to a rotating electrical machine, the control system comprising:
    a microcontroller configured to receive an initial mode request and implementing:
        a command-generating device configured to supply commands and to transfer the initial mode request to an output pin of the microcontroller, and
        an accidental starting detection device;
    a driver configured to:
        receive the commands supplied by the microcontroller and a disable command, the disable command being either a partial disable command, a total disable command, or a software disable command,
        evaluate both the commands supplied from the microcontroller and the disable command, and, based upon the evaluation, generate an output command signal,
        supply the output command signal to the switch, the driver being connected to the output pin to receive the transferred mode request,
        wherein the output command signal selectively causes the rotating electrical machine to operate in an active mode or disables the rotating electrical machine, said active mode being one of a motor mode, an alternator mode, or a degraded alternator mode,
        while the driver is receiving the disable command, supply the output command signal to the switch independently of the commands received from the microcontroller such that the rotating electrical machine operates in the degraded alternator mode or is disabled,
    wherein the output pin is connected to an input pin of the microcontroller to receive the transferred mode request, and
    wherein the accidental starting detection device detects when the transferred mode request received on the input pin indicates the motor mode even though the initial mode request received by the microcontroller indicates the alternator mode, and, in this case, to send the disable command to the driver,
    wherein the disable command sent by the accidental starting detection device is the partial disable command, and
    wherein the driver is configured to receive the partial disable command, based upon which the driver operates in the degraded alternator mode.

2. The control system as claimed in claim 1, further comprising:
    a first sensor configured to supply a measurement of a first voltage of a first continuous voltage source to the microcontroller; and
    a first device for monitoring the measurement of the first voltage, configured to supply the disable command to the driver when the measurement of the first voltage falls below a predefined threshold,
    wherein the first device is implemented by the microcontroller.

3. The control system as claimed in claim 1, wherein the driver comprises a first input configured to receive the total disable command, and wherein the driver is configured such that, as long as the total disable command is received on the first input, the output command signal keeps the switch open independently of the commands received.

4. The control system as claimed in claim 3, wherein the driver comprises:
   a command management device configured to generate an input command signal from the commands received from the microcontroller, and
   an amplifier configured to amplify the input command signal to supply the output command signal to the switch, the amplifier having two positive and negative supply terminals to receive a supply voltage, and
   a device for disabling the amplifier which, on receiving the total disable command, reduces the supply voltage so that the output command signal keeps the switch open regardless of the input command signal.

5. The control system as claimed in claim 4, wherein the disabling device is configured to short-circuit the supply terminals of the amplifier on receiving the total disable command.

6. The control system as claimed in claim 4, wherein the disabling device comprises a controllable short circuit switch having a current input terminal connected to the positive supply terminal, a current output terminal connected to the negative supply terminal, and a control terminal, the total disable command taking the form of a voltage between the control terminal and the current output terminal.

7. The control system as claimed in claim 4, wherein a first device for monitoring a measurement of a first voltage of a first continuous voltage source is configured to supply the total disable command to the first input of the driver when the measurement of the first voltage falls below a first predefined threshold, wherein the driver further comprises a second input configured to receive the partial disable command, and further comprises:
   a second sensor configured to supply a measurement of a second voltage of a second continuous voltage source, different from the first voltage, and
   a second device for monitoring the measurement of the second voltage configured to supply the partial disable command to the second input of the driver when the measurement of the second voltage falls below a second predefined threshold.

8. A switching arm system for a voltage converter, comprising:
   a high-side switch;
   a low-side switch; and
   a first control system for one of the high-side and low-side switches as claimed in claim 1,
   wherein the high-side switch and the low-side switch are connected to each other at a midpoint intended to be connected to a phase of a rotating electrical machine.

9. The switching arm system as claimed in claim 8, further comprising: a second control system for the other of the high-side and low-side switches.

10. An electrical installation comprising:
    a control system as claimed in claim 1; and
    a first continuous voltage source configured to supply the first voltage.

* * * * *